July 29, 1958
H. N. IRVINE
2,844,931
DRAWBAR FOR DRAFT CONNECTING BETWEEN A TRACTOR
AND A TRAILING IMPLEMENT
Filed July 18, 1955
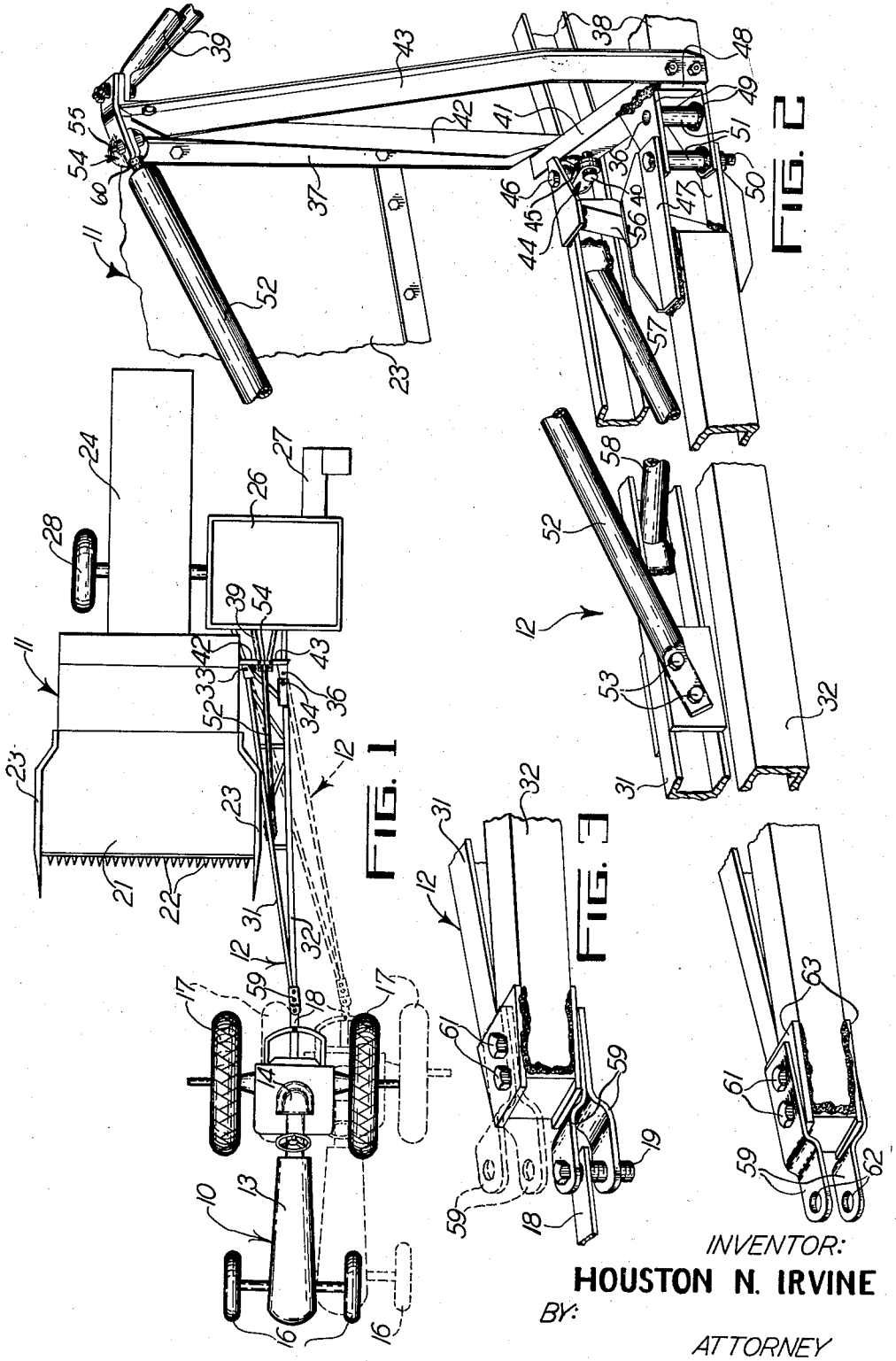
INVENTOR:
HOUSTON N. IRVINE
BY:
ATTORNEY

United States Patent Office 2,844,931
Patented July 29, 1958

2,844,931

DRAWBAR FOR DRAFT CONNECTING BETWEEN A TRACTOR AND A TRAILING IMPLEMENT

Houston N. Irvine, Burlington, Iowa, assignor to J. I. Case Company, Racine, Wis., a corporation of Wisconsin Application July 18, 1955, Serial No. 522,767

1 Claim. (Cl. 56—20)

This invention relates to agricultural machinery, and specifically, it relates to the drawbar and attachment thereof between a tractor and an implement towed thereby.

It is an object of this invention to provide a drawbar and an attachment therefor between a towing and a towed vehicle whereby the lateral position of one vehicle with respect to the other can be varied. The accomplishment of this object permits, for instance, an agricultural combine to be offset to one side of a tractor in the operation of the combine, and it alternately permits the combine to be disposed more nearly in longitudinal alignment with the tractor for transporting the combine. Thus, in the combine operating position, the combine is offset, as desired, and the tractor and combine overall width is a maximum but the width can be reduced for transporting the combine along narrow roads, through narrow gates, and the like.

Another object of this invention is to achieve the foregoing object with a minimum of modification of already existing combines.

Other objects are to provide a drawbar structure which is inexpensive, sturdy, easily altered between operating and transport positions, and which structure renders it easier for the operator to steer the vehicles.

Further objects and advantages will become apparent from reading the following description in conjunction with the accompanying drawings, wherein:

Fig. 1 is a diagrammatic plan view of one embodiment of this invention with the dotted lines showing a second position.

Fig. 2 is an enlarged and fragmentary front perspective view of the drawbar and a fragment of a combine.

Fig. 3 is a perspective fragmentary view of the front of the drawbar with the hitch plates thereof shown in two different positions.

The same reference numerals refer to the same parts in the three views.

Fig. 1 shows a tractor 10 draft attached to a combine 11, which is a trailing implement, through a drawbar 12. The tractor is of a conventional design and it includes the usual body 13, seat 14, front wheels 16, and rear wheels 17. Also, a tractor hitch 18 is attached to the rear end of the tractor and the drawbar 12 is pivotally connected to the hitch 18 through a pin 19. The combine 11 is also of a conventional design in that it includes a header portion 21 with the usual sickle bar 22 and side sheets 23, and a thresher section 24, a grain bin 26, and a discharge auger 27. The combine 11 is supported on the usual wheels such as the wheel 28.

Since the above-mentioned tractor 10 and combine 11, and the respective parts thereof, are conventional, no further description of them is deemed to be necessary.

It will be noted that Fig. 1 shows a second position of the tractor 10 and the drawbar 12 in dotted lines. To accomplish the shifted tractor position, the drawbar 12 is made to include an A-shaped frame with the apex of the drawbar at the tractor hitch 18 and the legs or draft members 31 and 32 of the drawbar attached respectively at 33 and 34 to the combine. The attachment point at 34 can be changed to the point at 36 while the drawbar 12 pivots at the point 33. As shown, attachment at 34 causes the drawbar and the tractor to assume the full line position which laterally shifts the tractor closer to alignment with the combine 11 for transport. Conversely, attachment at 36 causes the drawbar and the tractor to assume the dotted line position which shifts the tractor laterally clear of the header portion of the combine for operation of the latter. Further details of the drawbar and its connection will be described later but for the present it should be noted that the tractor and the combine are relatively laterally shiftable for operation of and for transporting the combine. In the transport position, the tractor is disposed substantially entirely within the lateral limits of the combine.

Fig. 2 shows the details of the drawbar 12 in three fragments thereof. It will be noted that the header side sheet 23 has an upright frame piece or angle iron 37 attached to it while other frame members 38 and braces 39 constitute additional sections of the combine frame as they connect to the combine at their rear ends which are not shown in Fig. 2. A piece 41 is horizontally disposed between the members 38, and angle irons 42 and 43 are connected between opposite ends of the piece 41 and the braces 39. It will be noted that the braces 42 and 43 converge at their upper ends as both braces are angularly disposed with respect to a vertical line from the base point of each brace.

Located at the point 33, which is at the rear end of the drawbar leg 31, is a universal type of connector 44 of the ball and socket type. The stationary portion 45 of the connector 44 is mounted on the piece 41 by bolts, such as bolt 40, while the movable portion is attached to the rear end of the frame leg 31 through the bolt 46. Thus, the connector 44 provides a universal hinge at the point 33 and the connector is a horizontally and vertically movable draft joint. The rear end of the leg 32 is provided with upper and lower plates or draft connections 47 which extend rearwardly of the leg in the spaced apart positions shown. Also, the piece 41 has a bracket or hitch means 48 attached thereto with upper and lower sections 49 spaced to be disposed between the spacing of the plates 47 which are hitch means on the drawbar. A pair of tubular support bearings 51 are connected between the sections 49 to be vertically disposed and aligned with holes in the sections 49, such as the hole at the point 36. A bolt 50 is disposed at the point 34 within one of the bearings 51 and the aligned holes in the mating connections which are the plates 47 and the sections 49.

With this arrangement, the drawbar 12 can be positioned on the combine 11 with the bolt 50 and, correspondingly, the plates 47, located at either of the points 34 or 36, and the front end of the drawbar will thus be selectively disposed for transport or operation of the combine. A brace 52, comprising a part of the drawbar 12, is attached between the upper ends of the braces 42 and 43 and the drawbar 12. The latter connection is shown in the center section of Fig. 2 where it is apparent that the brace is rigidly attached to the drawbar by bolts 53. However, since the connection of the brace 52 with the combine is not in vertical alignment with the connector 44, another universal hinge connector or horizontally and vertically movable draft joint 54 is employed at the connection point. In this instance, the stationary socket portion 55 of the connector 54 is again mounted on the combine while the movable ball portion 60 of the connector is attached to the brace 52 and is movably clamped within the socket portion 55. The provision of the two universal connectors 44 and 54 permits the drawbar to be swung about two points which are not vertically aligned. Since the drawbar is applied to an existing type of combine, and it is preferred that the drawbar be connected underneath the combine, the connector 54 cannot be located vertically above the connector 44; therefore, the universal type of connectors are employed. When the drawbar is in the transport position, the header 21 can be rested upon the drawbar, as indicated in Fig. 1. Of course, cross-braces 56, 57, and 58 are connected between the legs 31 and 32 of the drawbar 12.

Figs. 2 and 3 show a pair of hitch plates 59 secured to the front end of the drawbar 12 by bolts 61. Holes 62 are provided in the plates 59 for the reception of the usual draft pin 19. The front ends of the legs 31 and 32 of the drawbar are maintained together by two plates 63 welded to the legs. The plates 59 constitute a hitch connector which can, therefore, be removed from the Fig. 2 position on the drawbar and they can be placed in the solid line position of Fig. 3 so that the front end of the drawbar is raised and the combine is accordingly supported higher in the front than otherwise. Conversely, if the plates 59 are placed in the dotted line position of Fig. 3, the front of the combine is lowered. Thus, the combine can be leveled by the hitch plate arrangement. Thus, in the swinging of the drawbar about the inclined axis on a line between the connectors 44 and 54, the raising and lowering of the front end of the drawbar can be offset by the hitch plate adjustment.

While a specific embodiment of this invention has been shown and described, it should be obvious that certain changes could be made within the scope of the invention which should, therefore, be limited only by the appended claim.

I claim:

In combination with a towed implement of substantial height, a drawbar structure having three draft connections to said implement, two of said connections being laterally spaced and the other disposed a substantial distance above and laterally displaced from each of the first-mentioned two, the upper connection and one of the lower connections being universal hinge connections, the other lower connection including forward and rearward adjusting means to shift the forward end of the drawbar laterally of the implement by swinging the drawbar on said hinge connections.

References Cited in the file of this patent
UNITED STATES PATENTS

| | | |
|---|---|---|
| 1,200,075 | Burgess | Oct. 3, 1916 |
| 1,848,359 | Krause | Mar. 9, 1932 |
| 2,155,671 | MacGregor | Apr. 25, 1939 |
| 2,607,179 | Morrissey | Aug. 19, 1952 |